United States Patent
Na et al.

(10) Patent No.: US 12,134,206 B2
(45) Date of Patent: *Nov. 5, 2024

(54) NOZZLE OF AUTO-AGITATING TYPE 3D PRINTER FOR CONSTRUCTION

(71) Applicant: SAMSUNG E&A CO., LTD., Seoul (KR)

(72) Inventors: Ho Sung Na, Hanam (KR); Dong Hyun Kim, Seoul (KR); Ju In Park, Seoul (KR); Hyung Woo In, Seoul (KR); Hye Jin Ryu, Hanam (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/265,389

(22) PCT Filed: Jun. 15, 2022

(86) PCT No.: PCT/KR2022/008453
§ 371 (c)(1),
(2) Date: Jun. 5, 2023

(87) PCT Pub. No.: WO2022/270813
PCT Pub. Date: Dec. 29, 2022

(65) Prior Publication Data
US 2023/0390958 A1    Dec. 7, 2023

(30) Foreign Application Priority Data
Jun. 22, 2021   (KR) .................. 10-2021-0081200

(51) Int. Cl.
*B28B 1/093*    (2006.01)
*B28B 1/00*     (2006.01)
*B33Y 30/00*    (2015.01)

(52) U.S. Cl.
CPC .............. *B28B 1/093* (2013.01); *B28B 1/001* (2013.01); *B33Y 30/00* (2014.12)

(58) Field of Classification Search
CPC ......... B29C 64/209; B05B 1/26; B05B 15/20; B05B 15/25; B33Y 10/00; B33Y 30/00;
(Continued)

(56) References Cited

U.S. PATENT DOCUMENTS

| | | | | |
|---|---|---|---|---|
| 5,936,861 A | * | 8/1999 | Jang | ........................ B33Y 70/10 |
| | | | | 700/98 |
| 2002/0031046 A1 | * | 3/2002 | Schneider | ........... B01F 25/4315 |
| | | | | 366/337 |

(Continued)

FOREIGN PATENT DOCUMENTS

| CN | 113564588 A | * | 10/2021 |
|---|---|---|---|
| JP | H07029331 B2 | | 4/1995 |

(Continued)

OTHER PUBLICATIONS

Notice of Non-Final Rejection, dated Sep. 23, 2021, issued in Korean Application No. 10-2021-0081200, 5 pgs.

(Continued)

*Primary Examiner* — Jamel M Nelson
(74) *Attorney, Agent, or Firm* — Panitch Schwarze Belisario & Nadel LLP

(57) ABSTRACT

The present disclosure relates to a 3D printer for construction for printing and forming various structures, in which agitating blades 45 capable of auto-rotation are mounted inside a nozzle 10 discharging a printing material such as concrete or mortar, to thereby enable agitation of a fluid printing material inside the nozzle 10.

According to the present disclosure, agitation of the fluid printing material inside the nozzle 10 of the 3D printer for construction may be facilitated to prevent material segrega- (Continued)

tion and maintain a homogeneously mixed state of materials constituting the fluid printing material.

3 Claims, 17 Drawing Sheets

(58) Field of Classification Search
CPC ......... B28B 1/08; B28B 1/093; B28B 1/0935; B28B 1/001
See application file for complete search history.

(56) References Cited

U.S. PATENT DOCUMENTS

| 2009/0238911 | A1* | 9/2009 | Hayashi | B29C 48/022 |
| | | | | 425/202 |
| 2013/0286769 | A1* | 10/2013 | Baron | B01F 25/42 |
| | | | | 366/337 |
| 2017/0015061 | A1* | 1/2017 | Lewicki | B33Y 10/00 |

FOREIGN PATENT DOCUMENTS

| JP | 2019147338 A | * | 9/2019 |
| KR | 20160080894 A | | 7/2016 |
| KR | 101769144 B1 | | 8/2017 |
| KR | 101895151 B1 | | 9/2018 |
| KR | 20190065622 A | | 6/2019 |
| KR | 20200053973 A | | 5/2020 |
| KR | 102396629 B1 | | 5/2022 |

OTHER PUBLICATIONS

Notice of Allowance, dated Apr. 8, 2022, issued in Korean Application No. 10-2021-0081200, 1 pg.
International Search Report and Written Opinion, dated Oct. 11, 2022, issued in PCT/KR2022/008453, 7 pgs.

* cited by examiner

NOZZLE OF AUTO-AGITATING TYPE 3D PRINTER FOR CONSTRUCTION

TECHNICAL FIELD

The present disclosure relates to a 3D printer for construction for printing and forming various structures, in which agitating blades 45 capable of auto-rotation are mounted inside a nozzle 10 discharging a printing material such as concrete or mortar, to thereby enable agitation of a fluid printing material inside the nozzle 10.

BACKGROUND ART

A 3D printer for construction is an apparatus for building a structure of a predetermined shape by linearly extruding and stacking a fluid material e.g., concrete or mortar, and as such can omit or minimize the mold construction process necessarily required in the conventional construction of concrete structures and may have a significant advantage in terms of formability, construction time and etc. and Korean Patent NO. 1895151 may be cited as a related prior art.

In addition to Korean Patent NO. 1895151, in a conventional 3D printer for construction as shown in FIG. 1, a fluid printing material such as concrete or mortar is linearly extruded via a nozzle 10 mounted on a movable body 20, and a structure is formed as the linearly extruded printed object is stacked and cured, and printing of a wall body is illustrated in FIG. 1 by way of example.

An object printed by a 3D printer for construction as described above basically has a form of a linear extrudate and a planned structure is formed as a linear extrudate is stacked along the moving path of a movable body 20 and a nozzle 10. Although the 3D printer illustrated in FIG. 1 is configured such that the nozzle 10 for discharging a printed object is mounted on the movable body 20, wherein the movable body 20 is configured to make a horizontal reciprocating motion along a rail 92 liftably mounted on a gantry crane-type frame 90, other various schemes other than the aforementioned configuration that allow free movement of the movable body 20 mounted with the nozzle 10, e.g., a jib crane, may be applied.

DESCRIPTION OF EMBODIMENTS

Technical Problem

As described above, an object printed by a 3D printer for construction can be basically regarded as a fluid linear extrudate. Such fluid materials, e.g., concrete or mortar, as shown in FIGS. 1 and 2 may be supplied from the outside of the 3D printer via a supply pipe 95 and discharged through a nozzle 10 by various pressurizing means while being loaded in a hopper 15, and the enlarged part of FIG. 2 shows an application of a male-type screw as a typical pressurizing means included in the hopper 15.

As such, as shown in FIG. 2, pumping of a printing material inside the nozzle 10 and discharge of a printing material from a distal end of the nozzle 10 may be performed by means of a screw installed inside the hopper 15 or inside a pipe connecting between the hopper 15 and the nozzle 10, or by means of imparting airtightness to the hopper 15 and the nozzle 10 and then supplying a pressurized fluid, i.e., pressurized air. However, regardless of specific pumping means creating a transfer pressure or a discharge pressure inside the nozzle 10, the fluid printing material once having entered the nozzle 10 is pumped along the axial transfer path of the nozzle 10, wherein the entire area of the fluid printing material located on the cross section of the nozzle 10 cannot but be transferred in a direction parallel to the axial direction of the nozzle 10.

That is, the nozzle 10 of a conventional 3D printer for construction has a structure that severely restricts non-axial movements of the fluid printing material being pumped, which makes any type of mixing or agitation impossible during transferring process via the nozzle 10.

As described above, the fluid printing material of a 3D printer for construction, which mainly includes concrete or mortar, is a mixture containing particulate aggregates, cement, water, etc. and various heterogeneous granular bodies constituting the aggregates are separated from each other by differences in specific gravity or differences in particle size, thus giving rise to a material segregation phenomenon which destroys a homogeneous mixed state between materials constituting the fluid printing material.

This material segregation phenomenon, while varying in severity, is an inevitable phenomenon in the concrete as a mixture of heterogeneous granular bodies and liquid. In the conventional construction of concrete structures, mixed concrete materials are continuously agitated throughout the entire process from transportation right before the pouring of the concrete, and various measures, such as optimization of water content and particle size distribution of aggregates, are taken to prevent material segregation. For example, fluid concrete already poured in the mold may also be subject to vibration by placing a vibrating device or the like.

However, such measures taken in the conventional concrete construction are not applicable to an object printed by a 3D printer for construction. Unlike the conventional concrete construction, the concrete construction by a 3D printer for construction excludes the use of molds such as formwork, so that in the concrete construction by a 3D printer for construction, it is impossible to take any measures including vibration on the printed object once discharged from the nozzle 10. Also, in the concrete construction by a 3D printer for construction, continuous stirring, as in ordinary concrete, cannot be performed at all on the printing material or mixed material on the path before the nozzle 10, such as the hopper 15 and the supply pipe 95, as well as the printing material transferred through the nozzle 10.

As described above, some 3D printers for construction may have a helical screw mounted in the hopper 15 or on the path between the hopper 15 and the nozzle 10, as a pressurizing means for transferring a printing material; however, this is to pump the fluid printing material in one direction and thus has a very limited effect in mixing and agitating the printing material.

Therefore, in a conventional 3D printer for construction incapable of agitating a fluid printing material, measures to suppress material segregation are implemented, such as exclusion of aggregates having large particle diameters and increasing the viscosity of fluid printing material, but such measures inevitably result in an insufficient strength of the final structure and a transfer failure during operation of the 3D printer for construction.

Solution to Problem

To address the aforementioned issues, the present disclosure provides a nozzle 10 of an auto-agitating type 3D printer for construction, more particularly, a nozzle 10 of a 3D printer for construction, wherein a main shaft 30 parallel to the nozzle 10 is embedded in the nozzle 10, a rotatable body 40 that freely rotates about the main shaft 30 is installed, and a plurality of agitating blades 45 inclined relative to the main shaft 30 are radially arranged about the main shaft 30 on an outer circumferential surface of the rotatable body 40, such that as a fluid printing material is discharged via the nozzle 10, the agitating blades 45 and the rotatable body 40 rotate around the main shaft 30.

In addition, a nozzle of an auto-agitating type 3D printer for construction may be characterized in that a plurality of fixed blades 47 parallel to a central axis of the nozzle 10 are radially arranged about the central axis of the nozzle 10 on an inner circumferential surface of the nozzle 10 between the agitating blades 45 and a distal end of the nozzle 10, wherein the main shaft 30 may be a hollow pipe body having a transfer hole 33 formed in an axial direction therein and being connected to an exposed pipe 36, which is a pipe body having the transfer hole 33 formed in an axial direction therein and exposed outside the nozzle 10, and the other end of the main shaft 30 at a distal end of the nozzle 10 may be connected to the exposed pipe 36 such that as a filament material 31 introduced into the transfer hole 33 of the exposed pipe 36 is discharged via the main shaft 30 from an end of the main shaft 30 at the distal end of the nozzle 10, the filament material 31 may be co-printed with a printing material while embedded therein.

In addition, the present disclosure provides a nozzle 10 of an auto-agitating type 3D printer for construction, more particularly, a nozzle 10 of a 3D printer for construction characterized in that a rotatable pipe 60 as a pipe body co-axial with the nozzle 10 may be installed at a distal end of the nozzle 10 in a freely-rotatable manner about a central axis of the nozzle 10, and a plurality of agitating blades 45 inclined relative to the central axis of the nozzle 10 are radially formed around the central axis of the nozzle 10 on an inner circumferential surface of the rotatable pipe 60, such that a fluid printing material is discharged via the nozzle 10, the agitating blades 45 and the rotatable pipe 60 rotate around the central axis of the nozzle 10.

In addition, the present disclosure provides a nozzle of an auto-agitating type 3D printer for construction characterized in that a fixed pipe 70 as a pipe body co-axial with the rotatable pipe 60 may be installed at a distal end of the rotatable pipe 60, and a plurality of fixed blades 47 parallel to a central axis of the nozzle 10 are radially formed around the central axis of the nozzle 10 on an inner circumferential surface of the fixed pipe 70, wherein the fixed pipe 70 and the nozzle 10 are connected by a restricting member 71.

Advantageous Effects of Disclosure

According to the present disclosure, agitation of the fluid printing material inside the nozzle 10 of the 3D printer for construction may be facilitated, thereby making it possible to prevent material segregation and maintain a homogeneously mixed state of each material constituting the fluid printing material.

In particular, by performing sufficient agitation right before discharging of the fluid printing material inside the nozzle 10, the shortcoming of a conventional 3D printer for construction, that is, material segregation during transfer inside the nozzle 10 and after discharging from the nozzle 10, may be effectively suppressed, and a homogeneous distribution created during the curing of a mixture including aggregates constituting the printing material may improve strength and durability of the finished structure.

In addition, since substantial agitation of the printing material of the 3D printer for construction is possible, large-particle aggregates, which are not applicable to conventional 3D printer for construction, can be applied, and since the viscosity of the fluid printing material can be set relatively low, transfer of the fluid printing material may be facilitated. Accordingly, construction convenience may be ensured, and structures satisfying various purposes and performances may be constructed by a 3D printer for construction.

EXPLANATION OF REFERENCE NUMERALS DESIGNATING THE MAJOR ELEMENTS OF THE DRAWINGS

10: NOZZLE
15: HOPPER
19: INPUT PIPE
20: MOVABLE BODY
30: MAIN SHAFT
31: FILAMENT MATERIAL
33: TRANSFER HOLE
34: CURVED PIPE
36: EXPOSED PIPE
39: BRACKET
40: ROTATABLE BODY
45: AGITATING BLADE
47: FIXED BLADE

51: DRIVING PULLEY
52: SUPPORT PULLEY
53: GUIDE PULLEY
54: ALIGNMENT ROLLER
56: BOBBIN
57: TRANSFER MOTOR
60: ROTATABLE PIPE
66: DRIVEN GEAR
67: DRIVING GEAR
68: DRIVING MOTOR
69: COUNTERWEIGHT
70: FIXED PIPE
71: RESTRICTING MEMBER
90: FRAME
92: RAIL
95: SUPPLY PIPE

MODE OF DISCLOSURE

The configuration and operating mechanism of the present disclosure will be described in detail with reference to the accompanied drawings below.

Figure 1:
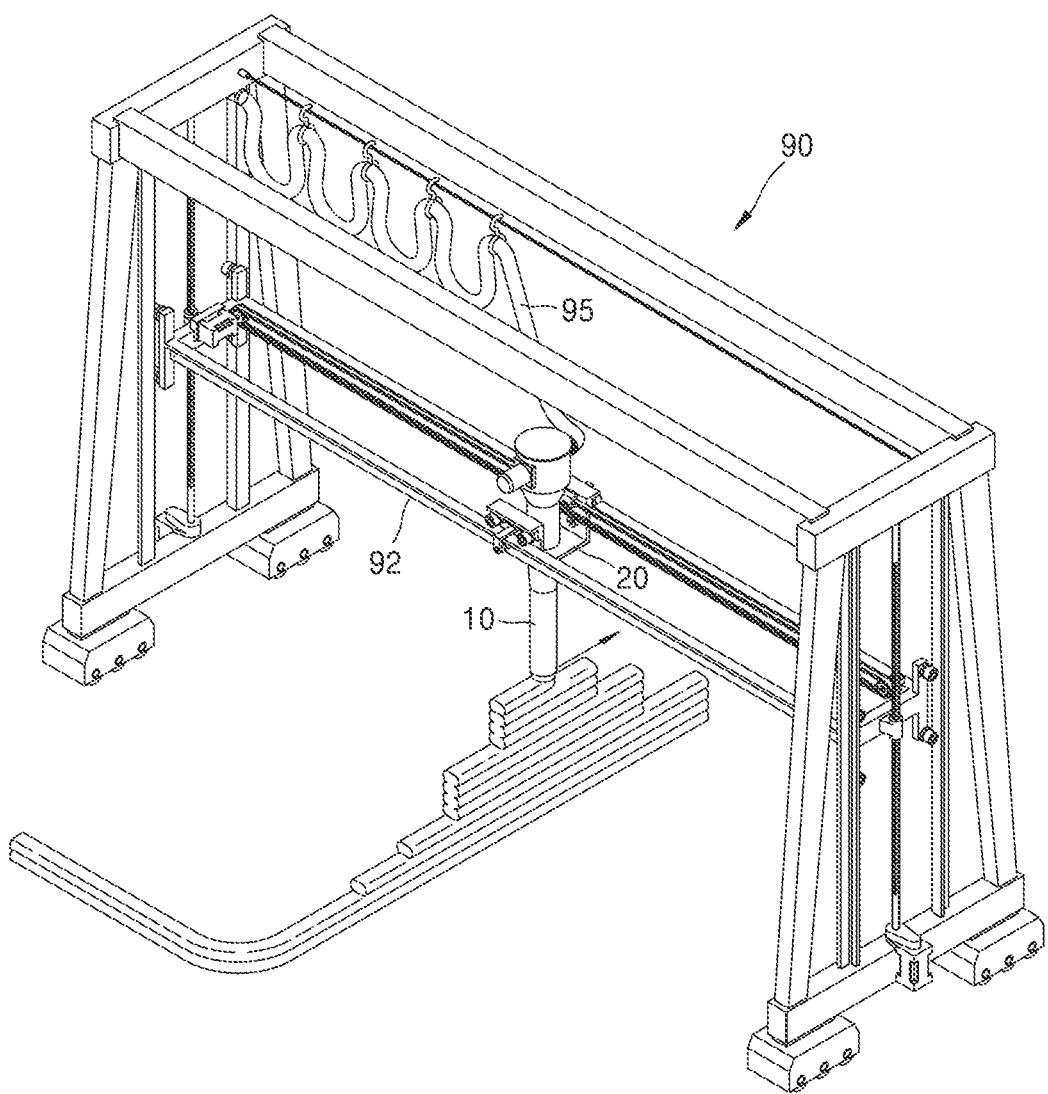
FIG. 1 illustrates an example of a 3D printer for construction in the prior art.
Figure 2:
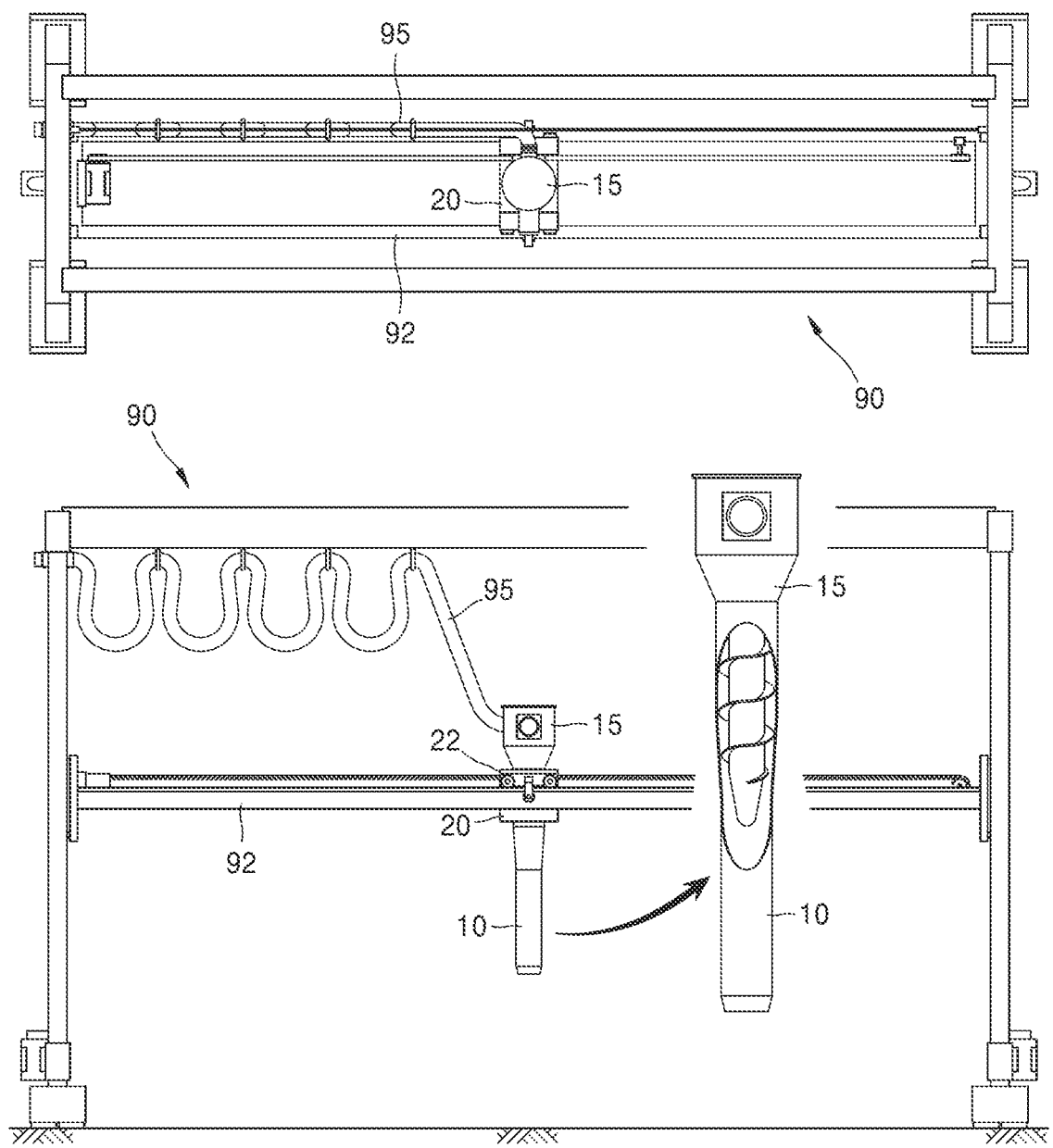
FIG. 2 is a front view and a plan view of a 3D printer for construction in the prior art.

First, FIGS. 1 and 2 show an overall configuration of a typical 3D printer for construction, and the 3D printer for construction illustrated in the drawings shows that a elevating type rail 92 is configured on a gantry crane-type frame 90, and a lateral reciprocating motion of a movable body 20 along this rail 92 causes the movable body 20 and the nozzle 10 to move.

In particular, the self-propelled gantry crane-type frame 90 may be applied as a basic framework of the 3D printer, wherein forward and backward motions of the self-propelled frame 90 in a longitudinal direction give a forward motion or a backward motion to the movable body 20 mounted with the nozzle 10, vertical movement of the movable body 20 is carried out by the rail 92 liftably mounted on the frame 90, and as the movable body 20 travels along the rail 92 in a lateral direction, left movement or right movement of the nozzle 10 is carried out.

This three-dimensional moving mechanism of the movable body 20 mounted with the nozzle 10 may be applied to the present disclosure as well. The examples illustrated in FIGS. 1 and 2 show a self-propelled gantry crane-type moving mechanism; however, as described above, cranes of various types, i.e., a jib crane, as well as various means of movement enabling three-dimensional movements of the nozzle 10 may be used.

Figure 3:
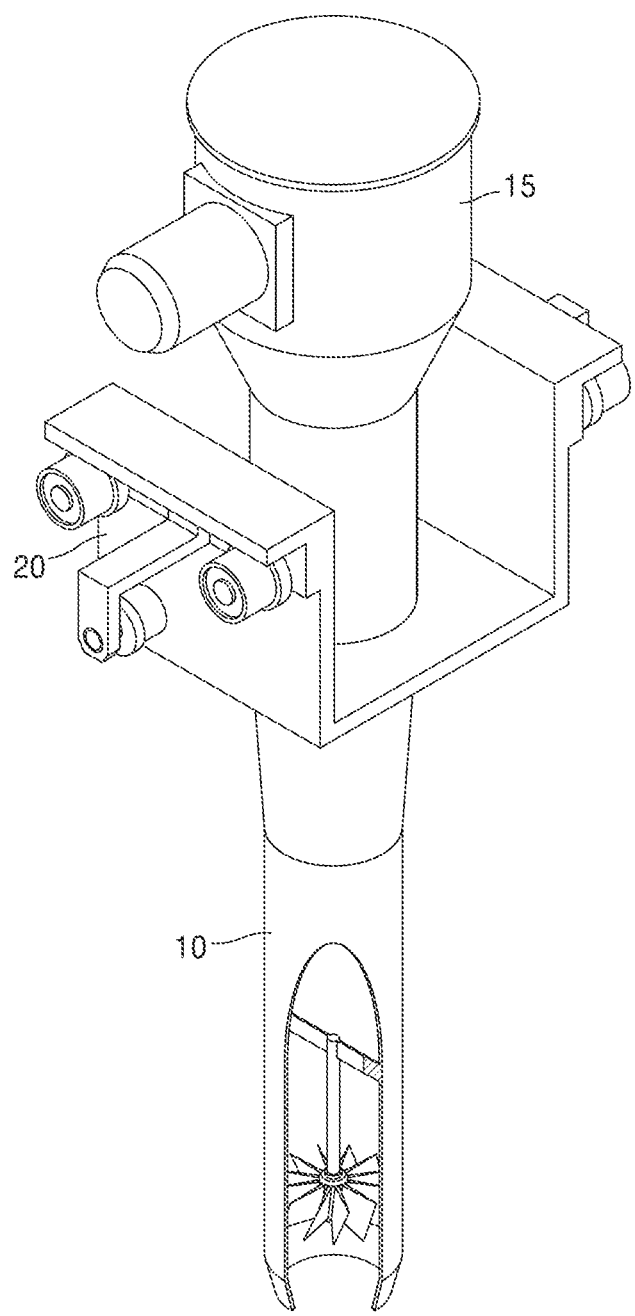
FIG. 3 is a partially-cut perspective view of the present disclosure.

FIG. 3 is a perspective view showing an outer appearance and an inner structure of the present disclosure. As shown, the present disclosure relates to a nozzle 10 which is a final printing material discharge end of a 3D printer for construction, wherein various structures and types may be applied to a connection pipe between a hopper 15 and a nozzle 10, a hopper 15 or a supply pipe 95, which is a transfer path of the fluid printing material, prior to the nozzle 10.

Figure 4:
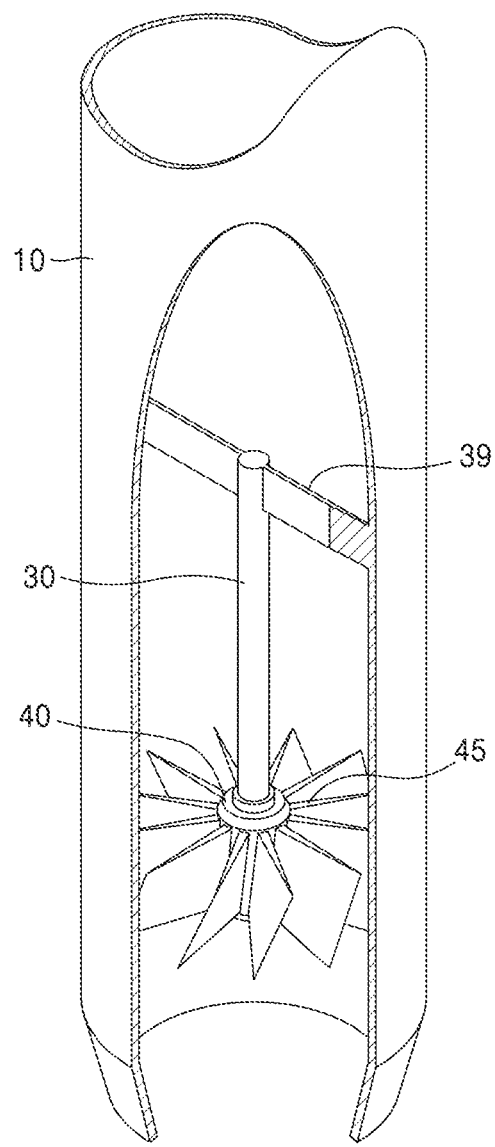
FIG. 4 is a partially-cut perspective view of a main part of the present disclosure.

That is, the present disclosure relates to a nozzle 10 of a 3D printer for construction, and as shown in FIGS. 3 and 4, a main shaft 30 parallel to a nozzle 10 may be embedded in the nozzle 10, and a rotatable body 40 that freely rotates around the main shaft 30 may be installed, wherein a plurality of agitating blades 45 inclined relative to the main shaft 30 are radially formed around the main shaft 30 on the outer circumferential surface of the rotatable body 40. As shown in FIG. 5A, as a fluid printing material is discharged through the nozzle 10, the agitating blades 45 and the rotatable body 40 rotate around the main shaft 30, thereby agitating the fluid printing material.

As shown in FIGS. 3 and 4, inside the nozzle 10, which is a pipe body with an open distal end, the main shaft 30, which serves as an axis of rotation of the rotatable body 40 and the agitating blades 45, may be installed, wherein the main shaft 30 is a rod body installed in a direction parallel to the central axis of the nozzle 10, and as in the drawings, the main shaft 30 may be concentric and co-axial with the nozzle 10, and the rotatable body 40 may be coupled in a freely rotatable manner to an end of the main shaft 30 at the distal end of the nozzle 10, and the other end of the main shaft 30 at the distal end of the nozzle 10 may be fixed to the inner circumferential surface of the nozzle 10 by the bracket 39 or the like.

The rotatable body 40 coupled to the end of the main shaft 30 at the distal end of the nozzle 10, that is, the lower end of the main shaft 30 in the drawing, may be freely rotated around the main shaft 30 and coupled in a manner that restricts separation from the main shaft 30. On the outer circumferential surface of the rotatable body 40, a plurality of inclined agitating blades 45 may be arranged radially and in an equiangular manner around the main shaft 30 on a plane.

Figure 5:
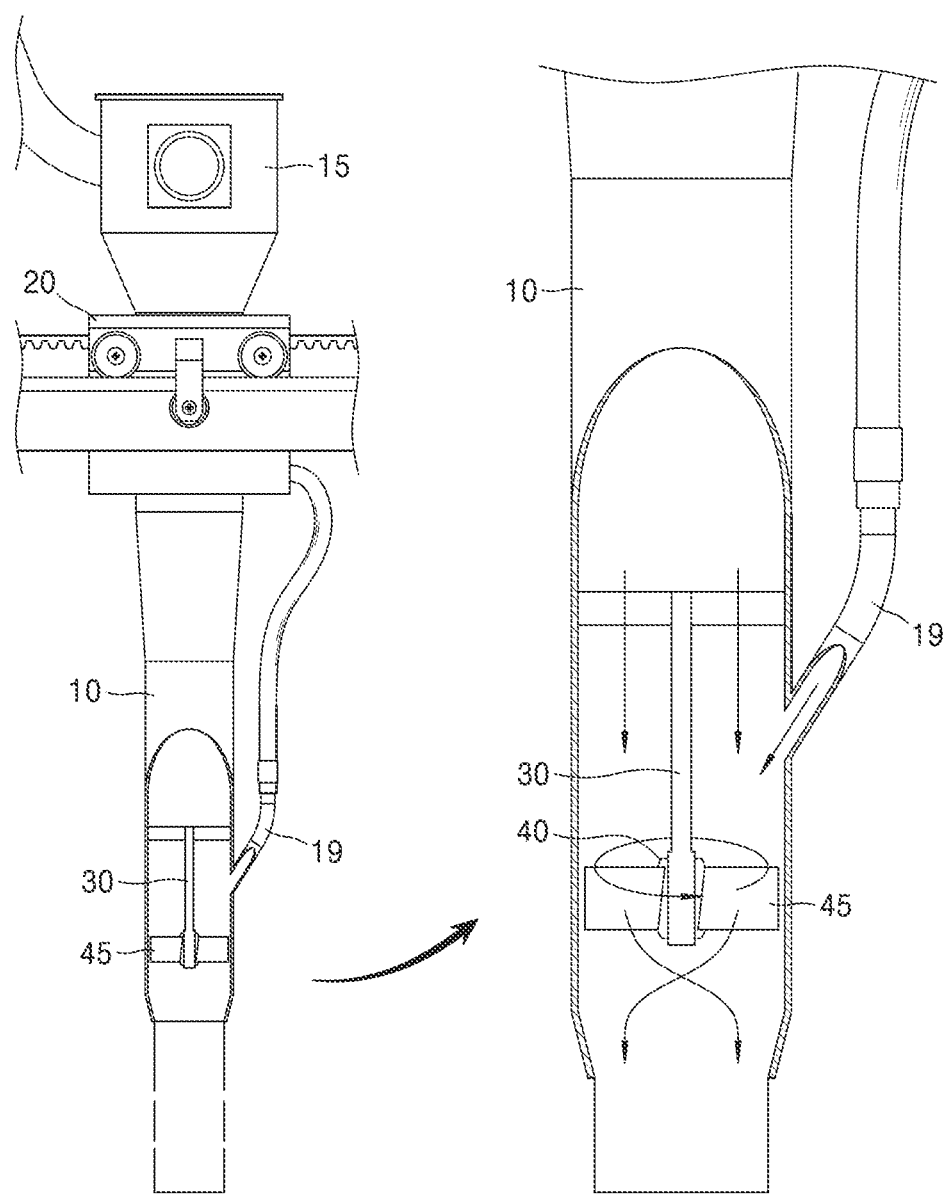
FIG. 5 is a cross-sectional view of an operating state of the present disclosure.

Accordingly as shown in FIG. 5, during the process of pumping and discharging a fluid printing material via the nozzle 10, the inclined agitating blades 45 and the rotatable body 40 may be rotated without an additional power, and during this process, the fluid printing material passing through the agitating blades 45 may be agitated, allowing a mixture of various particles constituting the fluid printing material to be homogeneously mixed.

Meanwhile, in the embodiment shown in FIG. 5, an input pipe 19 may be connected to the nozzle 10 wherein an additive is introduced into a fluid printing material inside the nozzle 10. Here, the additive introduced into the distal end of the nozzle 10 may be, for example, a curing accelerator for inducing rapid curing of the discharged printing material, and such addition of an additive may be applied to the nozzle 10 of the present disclosure to achieve a further improvement.

Since when constructing a structure using a 3D printer for construction, rapid curing of a fluid printing material discharged via a nozzle 10 is critical to ensuring construction efficiency as well as stability of the structure and operation safety, a curing accelerator for the fluid printing material may be added. Here, if the curing accelerator is added during the very first compounding of materials or during the process of transferring the fluid printing material such as a hopper 15, transfer of the fluid printing material may fail due to excessively rapid solidification of the materials. Therefore, there may be a need to add a curing accelerator at the final discharge end of the nozzle 10.

However, since there is no means of substantial agitation inside a nozzle 10 in a prior art, the added curing accelerator may fail to be uniformly mixed with the fluid printing material but rather remains concentrated on the surface portion thereof. This may not only result in a decrease in the effect of the added curing accelerator, but also cause differential curing and material segregation, critically undermining the stability and durability of the entire structure.

On the other hand, in the present disclosure as shown in FIG. 5, even when an additive such as a curing accelerator is introduced through an input pipe (19) connected to the distal end of the nozzle 10, the additive introduced can be mixed uniformly with the fluid printing material subsequently by the agitating blades 45. As a result, the purpose of addition of an additive may be fully achieved, and adverse side effects such as differential curing and material segregation may be avoided.

Accordingly, by embedding freely rotating agitating blade 45 in the distal end of the nozzle 10 of a 3D printer for construction, sufficient agitation may be performed immediately before the final discharge of the fluid printing material. However, during the rotational agitation process of a printing material, if an excessive rotational force is applied to the printing material being discharged, the discharged shape of the printing material and interlayer adhesion of linear printed objects may be adversely affected.

Figure 6:
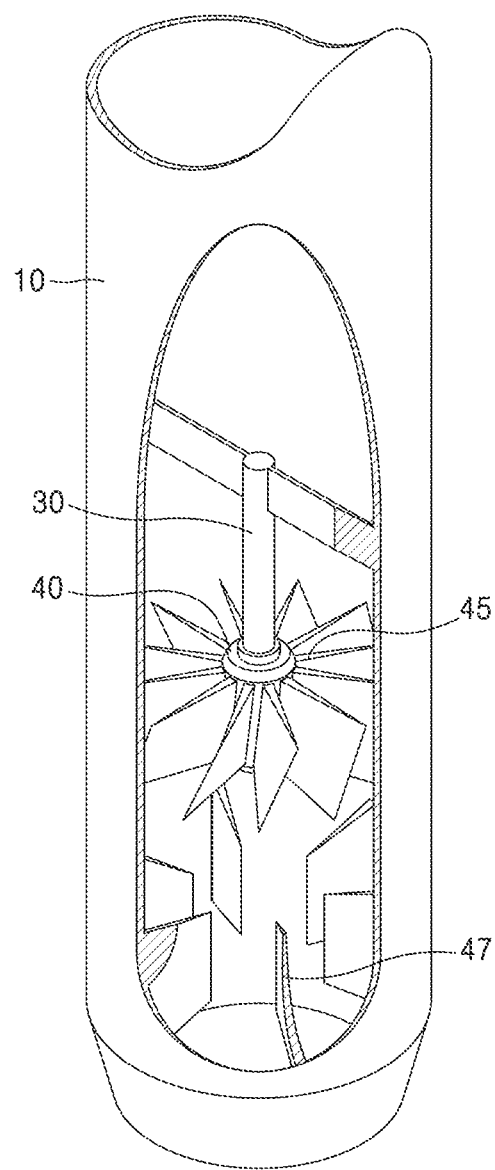
FIG. 6 is a partially-cut perspective view of a main part of an embodiment of the present disclosure including fixed blades.
Figure 7:
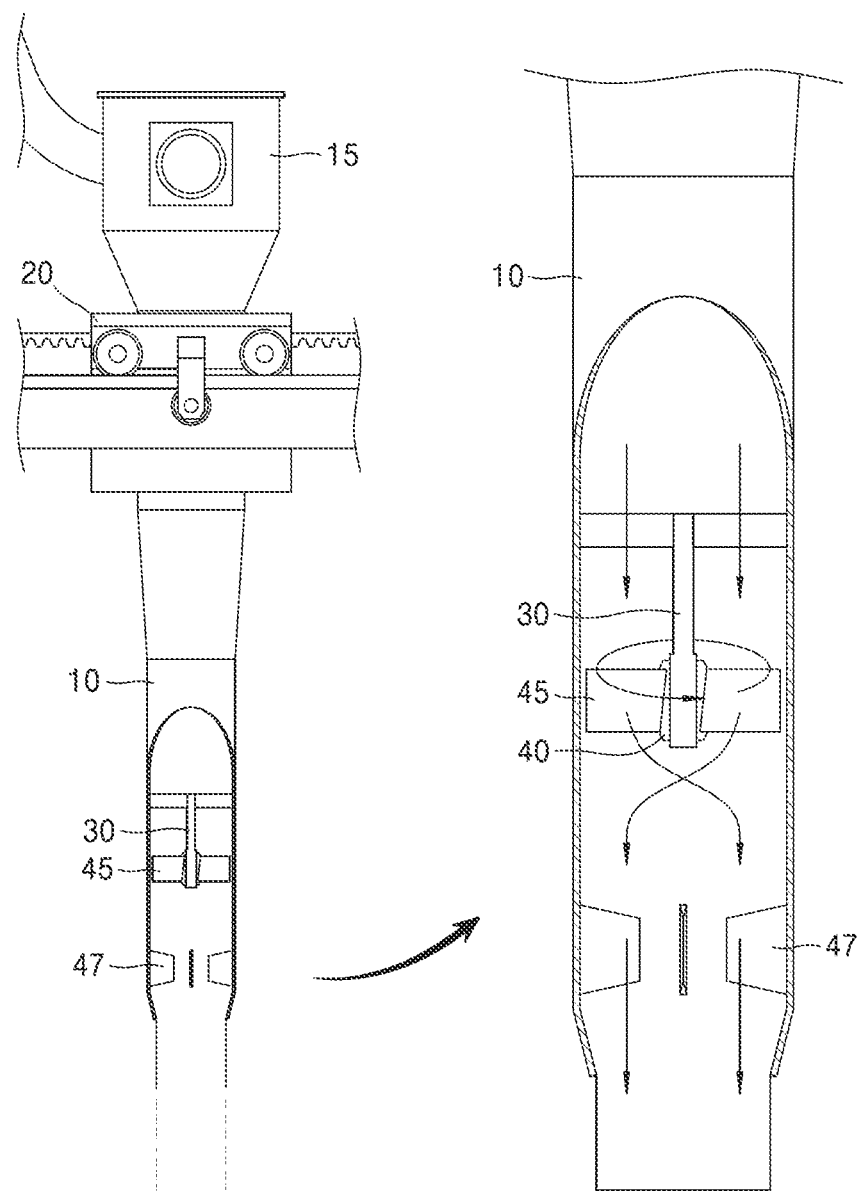
FIG. 7 is a cross-sectional view of an operating state of the embodiment depicted in FIG. 6.

In this context, as a means for aligning the printing material with an imparted rotational force right before being departed from the nozzle 10, as shown in FIG. 6 and FIG. 7, a plurality of fixed blades 47 parallel to the central axis of the nozzle 10 are radially formed around the central axis of the nozzle 10 on the inner circumferential surface of the nozzle 10 between the agitating blades 45 and the distal end of the nozzle 10.

Accordingly as shown in FIG. 7, the fluid printing material, primarily agitated by the agitating blades 45, may be realigned while passing through the fixed blades 47. Here, no material segregation occurs while the primarily agitated fluid printing material is realigned, and this may be attributed to the fact that while the fluid printing material with an imparted rotational force passes through the fixed blades 47, a relative effect of reverse-rotation generates, thereby resulting in the same or similar effect achieved by performing agitation again in a reverse direction.

As such, in the embodiment of FIGS. 6 and 7, the agitating blades 45 and the fixed blades 47 perform a complementary role to each other, which achieves a sufficient agitating action inducing homogeneous mixing among materials while preventing unnecessary rotations of the finally discharged printing material.

Figure 8:
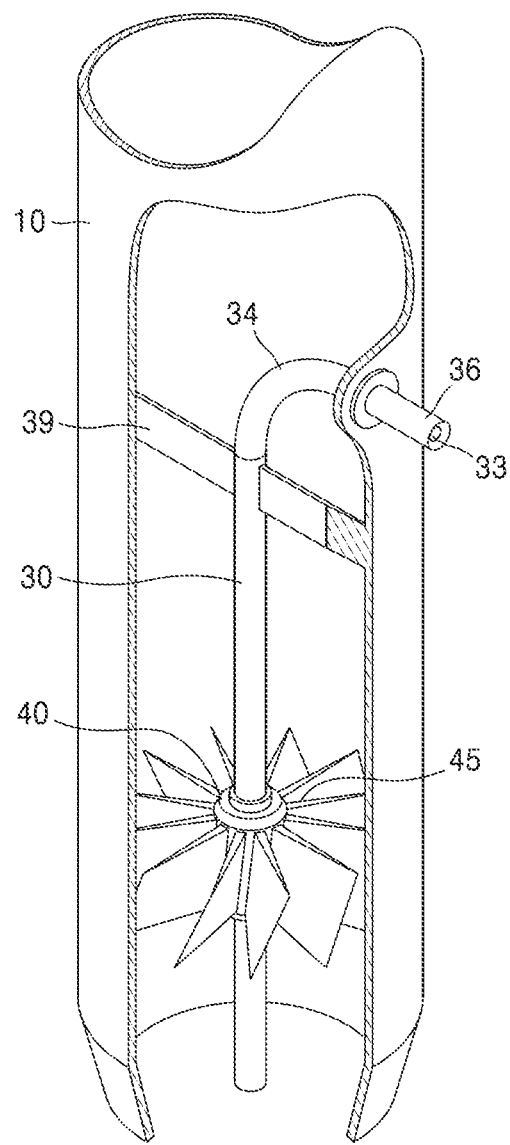
FIG. 8 is a partially-cut perspective view of a main part of an embodiment of the present disclosure including a transfer hole.
Figure 9:
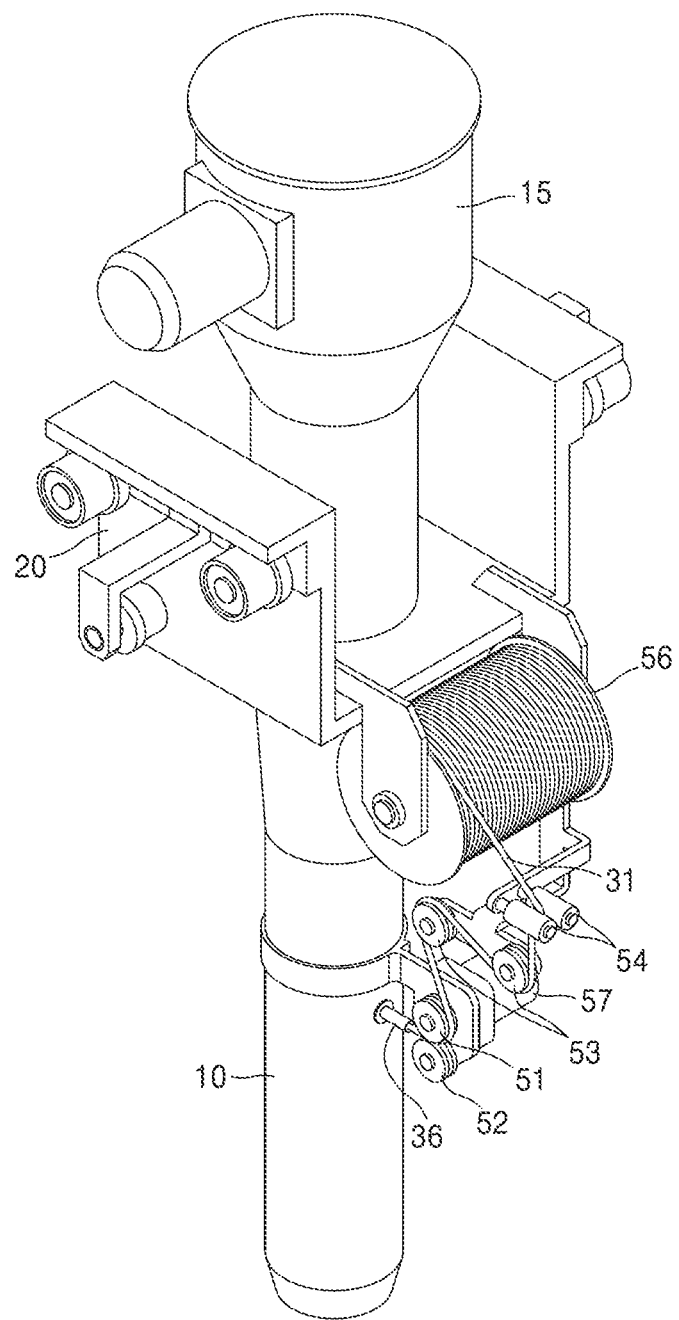
FIG. 9 is a perspective view of the embodiment depicted in FIG. 8.
Figure 10:
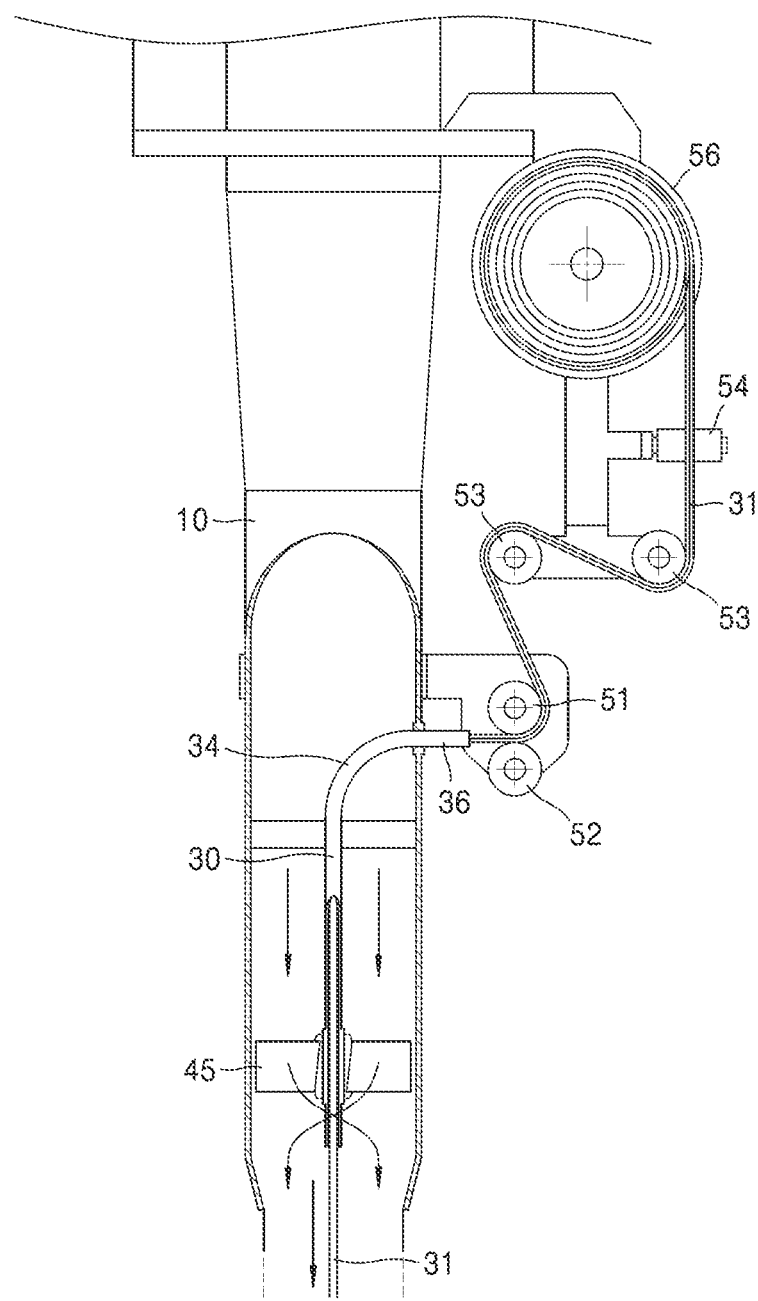
FIG. 10 is a cross-sectional view of an operating state of the embodiment depicted in FIG. 8.

Meanwhile, FIGS. 8 to 10 show a case in which a reinforcement filament 31 is embedded inside a linear printing material of a 3D printer for construction by utilizing a main shaft 30 embedded in an axial direction in a nozzle 10, thereby achieving a dramatic improvement in strength and durability of the printing material.

In such a filament material 31-embedded embodiment, the main shaft 30 embedded in the nozzle 10 as shown in FIGS. 8 to 10 may be a hollow pipe body having a transfer hole 33 formed in an axial direction therein. Further as shown in the same drawings, a pipe body, i.e., an exposed pipe 36 exposed outside the nozzle 10 and having the transfer hole 33 formed in an axial direction therein may be formed, and the other end of the main shaft 30 at the distal end of the nozzle 10 may be connected to the exposed pipe 36.

Therefore, as shown in FIG. 10, as the filament material 31 introduced into the transfer hole 33 of the exposed pipe 36 is discharged from the distal end of the nozzle 10 of the main shaft 30 via the main shaft 30, the filament material 31 may be co-printed with the printing material while embedded therein.

Accordingly, as the printing material is cured with a reinforcing material, i.e., the filament material 31 embedded in and attached to the printing material, a reinforcing effect as observed in a reinforcing material-embedded concrete, i.e., reinforced concrete, may be obtained. Moreover, as tensile strength of the printing material increases and cracking is suppressed, improvement in the structural stability and durability of a structure constructed with a printed object of a 3D printer for construction may be achieved.

As shown in FIGS. 8 and 10, an end of the main shaft 30, which is a hollow pipe body, at a distal end of the nozzle 10, may be open and discharge the transferred filament material 31 therefrom, and the other end of the main shaft 30 at the other distal end of the nozzle 10 may be connected to the exposed pipe 36 outside the nozzle 10 via a curved pipe 34 such that as the filament material 31 is transferred via the exposed pipe 36, the curved pipe 34, and the transfer hole 33 formed in the main shaft 30, the filament material 31 may be discharged from the distal end of the main shaft 30, and through a configuration as shown in FIG. 9 and FIG. 10, the filament material 31 may be continuously supplied to the exposed pipe 36.

In the filament material 31-embedded type embodiment of the present disclosure, a means for continuously supplying the filament material 31 may be mounted on the nozzle 10 or the movable body 20, as shown in FIGS. 9 and 10, wherein the means for supplying the filament material 31 is configured with a plurality of pulleys, a transfer motor 57, a bobbin 56 having the filament material 31 wound thereon, and the like.

A driving pulley 51 and a support pulley 52 installed at the entrance of the exposed pipe 36 are rotated in a reverse direction from each other, thereby continuously supplying the filament material 31 to the transfer hole 33 of the exposed pipe 36. As shown in FIG. 9, a transfer motor 57 may be connected to the driving pulley 51, and as the transfer motor 57 is operated, the driving pulley 51 may be rotated, thereby continuously introducing the filament material 31, which rotates in close contact with the driving pulley 51, into the exposed pipe 36.

In addition, regarding the filament material 31 moving between the driving pulley 51 and the support pulley 52, the outer circumferential surface of the filament material 31 remains compressed simultaneously by the driving pulley 51 and the support pulley 52. Thus, rotation of the driving pulley 51 by the transfer motor 57 and movement of the filament material 31 brings the support pulley 52 in a freely-rotating state into rotation in the opposite direction to the direction of rotation of the driving pulley 51, thereby pressing the filament material 31 and creating a compressed state between the driving pulley 51 and the filament material 31, and as a result, the rotational force of the driving pulley 51 may be fully converted to an axial transfer force of the filament material 31.

In the embodiment in FIGS. 9 and 10, the bobbin 56 on which the filament material 31 is wound may be mounted on the movable body 20; however, the bobbin 56 may be mounted on top of the nozzle 10, or a plurality of guide pulleys 53 in a freely rotatable state may be installed between the bobbin 56 and the driving pulley 51, thereby imparting an appropriate tension to the filament material 31 released from the bobbin 56 and entering between the driving pulley 51 and the support pulley 52. In addition, an alignment roller 54 installed around the bobbin 56 serves to align and guide the filament material 31 released from the bobbin 56 so as to allow the filament material 31 to stably enter to the guide pulley 53.

Accordingly, throughout the entire path of releasing and introducing the filament material 31 between the bobbin 56 and the exposed pipe 36, stable transfer of the filament material 31 may be possible without excessively fast release or release delay. In addition, as the driving pulley 51 and the filament material 31 stay tightly compressed against each other, rotation of the driving pulley 51 and transfer of the filament material 31 closely interact with each other, thereby enabling a precise control over the feed speed of the filament material 31 through control of the rotation speed of the transfer motor 57.

Through such precise control of the transfer speed of the filament material 31, it is possible to control such that the printing material and the filament material 31 be discharged precisely at the same speed when transferring of the filament material 31 and discharging of the printing material are carried out simultaneously. Accordingly, it may be possible to manage the state of the filament material 31 embedded in the printed object in an accurate and reliable manner.

As described above, through the main shaft 30 supporting the rotatable body 40 provided with the agitating blades 45, it may be possible to inhibit material segregation and ensure construction quality through agitating a printing material of a 3D printer for construction. Moreover, various improvements may be achieved, such as application of embedded filament material 31. However, due to expansion of components embedded in the nozzle 10, such as a main shaft 30 and a bracket 39 for mounting the main shaft 30, there may be issues such as a decreased cross-sectional area of the nozzle 10 and hindered pumping of the fluid printing material.

In this regard, the present disclosure prevents pumping resistance and a decrease in cross-sectional area of the nozzle 10 by excluding components related to support of the rotatable body 40 as well as the main shaft 30, and makes up a rotatable pipe 60 so as to ensure a sufficient agitating action for a fluid printing material, and embodiments relevant thereto are illustrated in FIG. 11 to FIG. 17.

Figure 11:
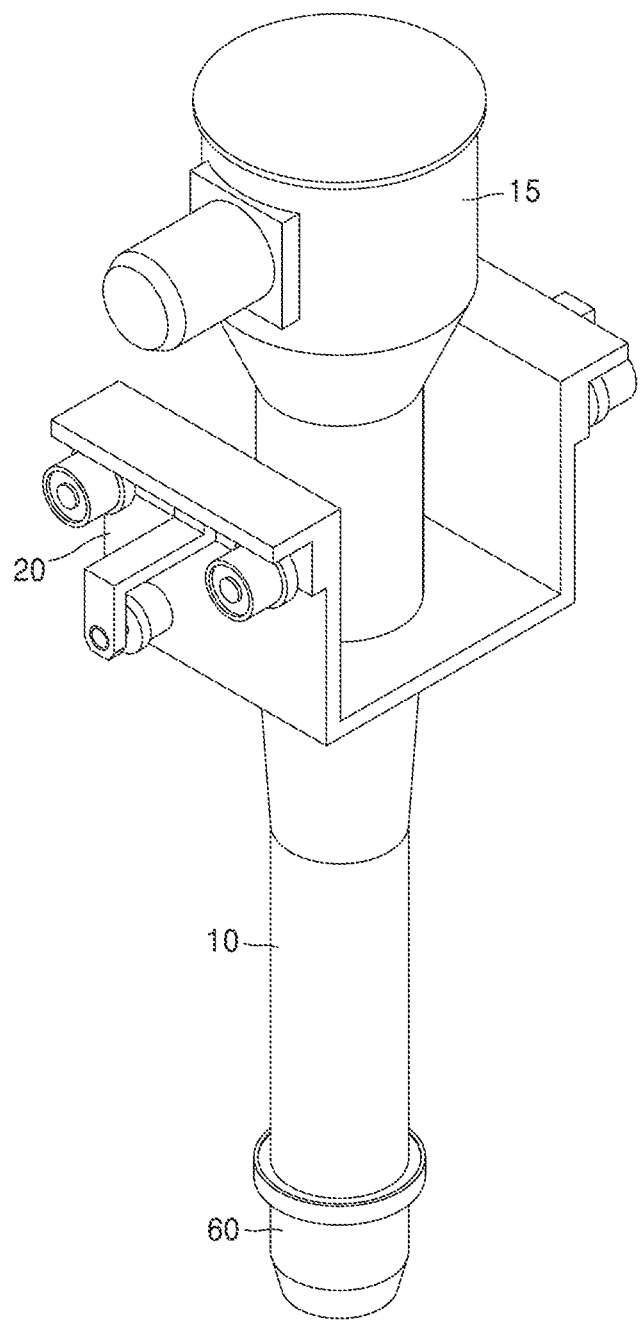
FIG. 11 is a perspective view of an embodiment of the present disclosure to which a rotatable pipe is applied.
Figure 12:
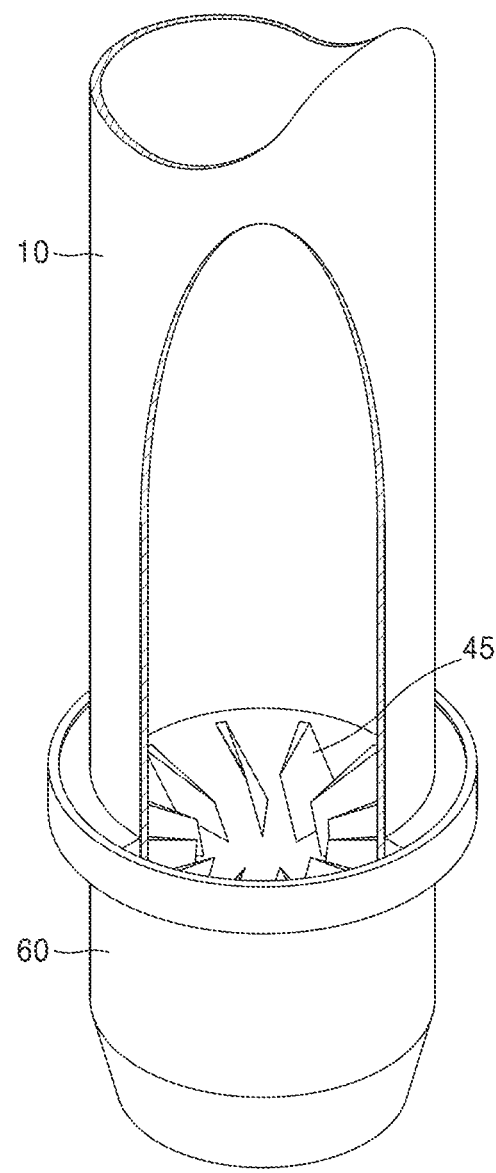
FIG. 12 is a partially-cut perspective view of a main part of the embodiment depicted in FIG. 11.
Figure 13:
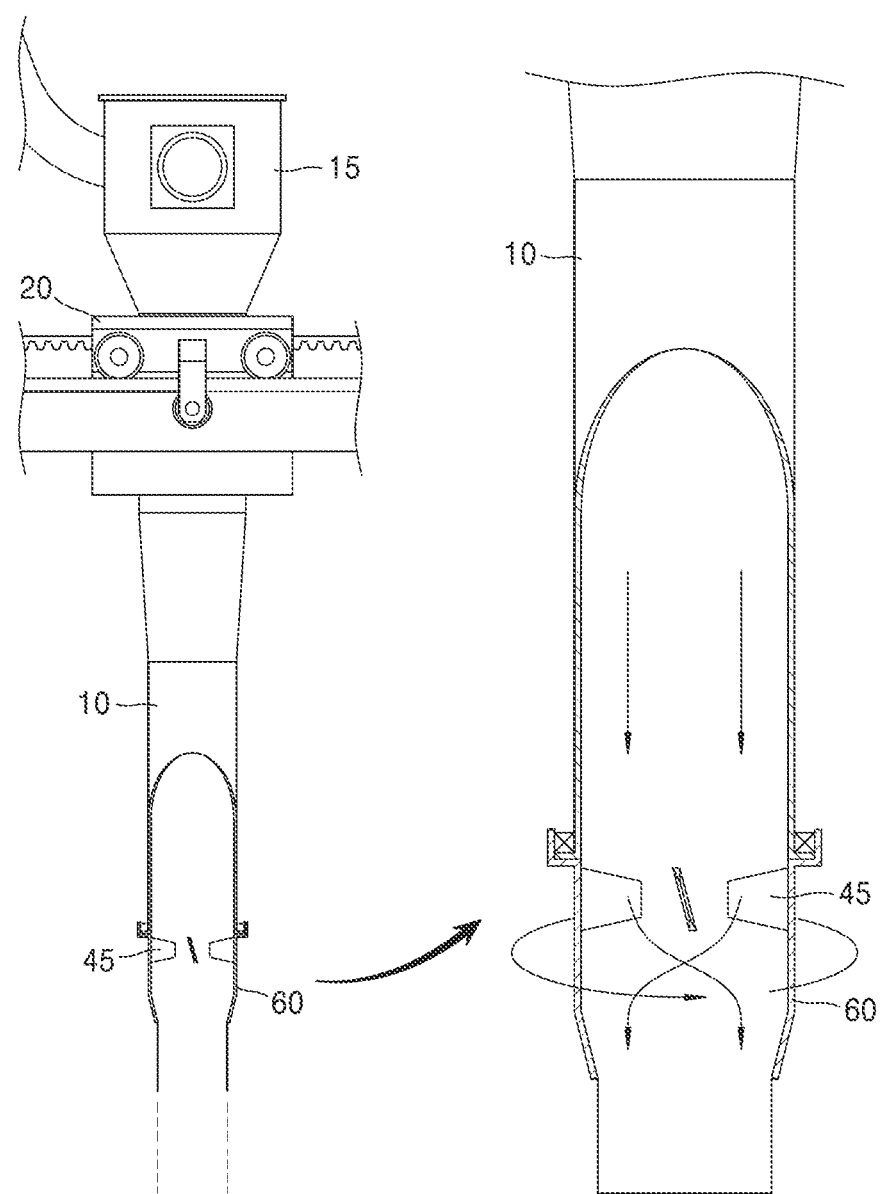
FIG. 13 is a cross-sectional view of an operating state of the embodiment depicted in FIG. 11.

First, illustrated in FIGS. 11 to 13 is an embodiment in which a freely-rotating rotatable pipe 60 is mounted at a distal end of a nozzle 10 of a 3D printer for construction. As shown in FIG. 11, at the distal end of the nozzle 10, the rotatable pipe 60 as a pipe body co-axial with the nozzle 10 may be installed so as to be rotatable around the central axis of the nozzle 10. As shown in FIG. 12, a plurality of agitating blades 45 inclined relative to a central axis of the nozzle 10 are formed radially around the central axis of the nozzle 10 on the inner circumferential surface of the rotatable pipe 60, such that as shown in FIG. 13, as a fluid printing material is discharged via the nozzle 10, the agitating blades 45 and the rotatable pipe 60 are rotated around the central axis of the nozzle 10.

The rotatable pipe 60 coupled to a lower end of the nozzle 10 in a freely-rotating manner is a pipe body with two open ends, wherein the nozzle 10 and the rotatable pipe 60 are connected to each other co-axially and concentrically. Although no reference numeral is given in the drawings, an annular bearing or the like may be provided to connect a pipe wall portion of the nozzle 10 and a pipe wall portion of the rotatable pipe 60.

The agitating blades 45 protruded towards the center of the rotatable pipe 60 from the inner circumferential surface of the rotatable pipe 60 are inclined relative to the central axis of the rotatable pipe 60, wherein a plurality of agitating blades 45 are arranged radially on a cross-section of the rotatable pipe 60, a plan view of which is shown in the drawings.

Accordingly, without any rotary shaft configured in the rotatable pipe 60 and the nozzle 10, particularly as shown in the embodiment configured with the main shaft 30 described above, facilitated rotation of the agitating blades 45 and facilitated agitation of the fluid printing material may be made possible even when shaft-related components encroaching the central portion of a cross-section of the nozzle 10 are completely excluded.

Figure 14:
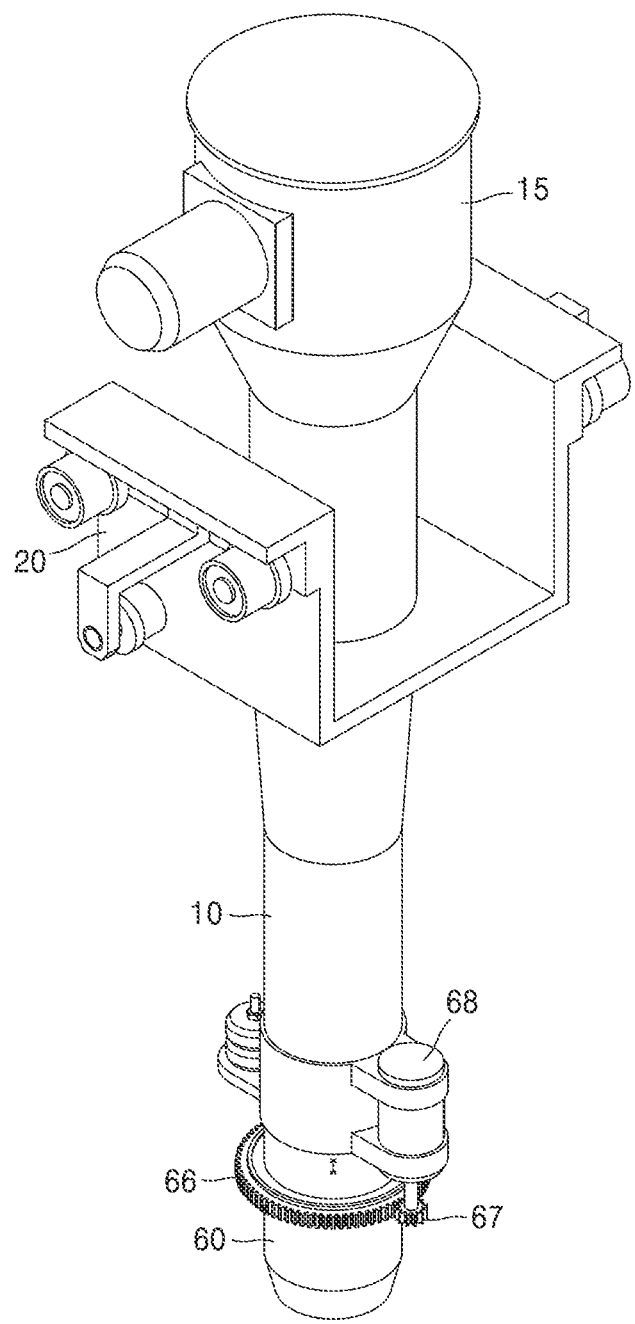
FIG. 14 is a perspective view of an embodiment of the present disclosure to which a motorized type rotatable pipe is applied.
Figure 15:
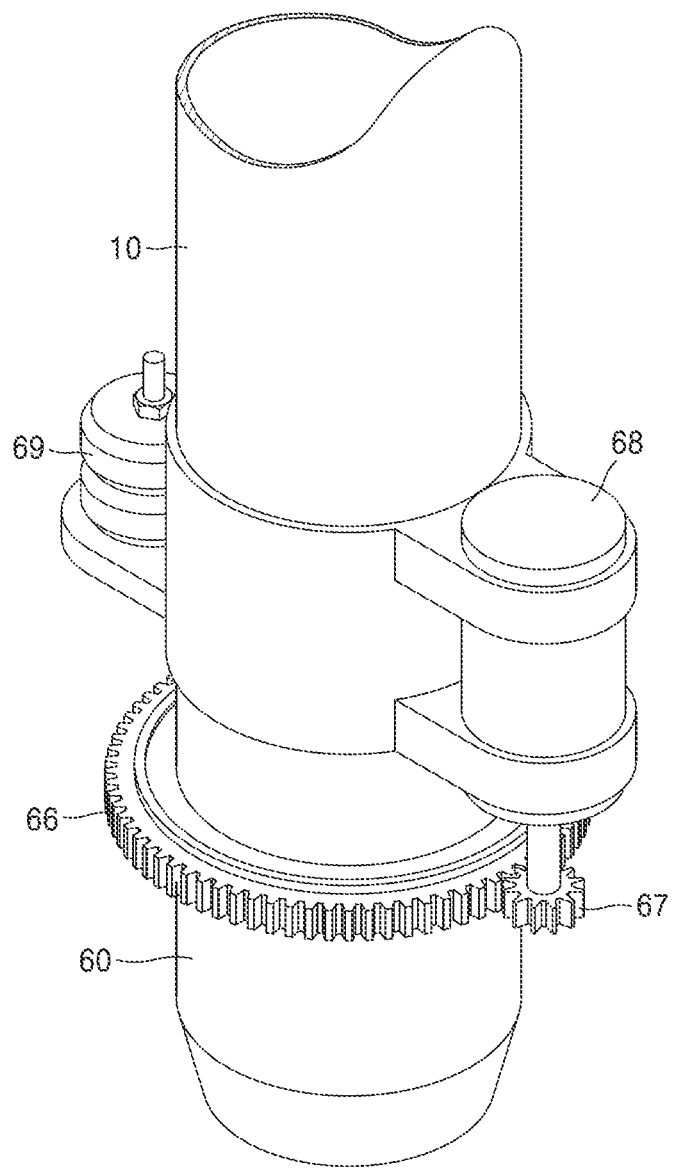
FIG. 15 is a perspective view of a main part of the embodiment of FIG. 14.

In particular, as shown in FIGS. 14 and 15, by installing a driven gear 66 on the outer circumferential surface of a rotatable pipe 60 and installing a driving gear 67 being engaged therewith, and by connecting the driving gear 67 to a driving motor 68 affixed to a nozzle 10, forced rotation and forced agitation of the rotatable pipe 60 may be possible, and as a result, agitation that is more robust than free-rotation of agitating blades 45 may be possible.

In such an embodiment of an motorized type rotatable pipe 60, a driving motor 68 driving the driven gear 66 may be mounted on a nozzle 10 right above the rotatable pipe 60, wherein a counterweight 69 planarly symmetric to the driving motor 68 may be provided to maintain a balance when moving a nozzle 10 of a 3D printer for construction and to mitigate drive shock of the driving motor 68.

Meanwhile, even in the nozzle 10 to which agitating blades 45-embedded rotatable pipe 60 is applied, while agitating a printing material by rotation, an excessive rotational force may be imparted to the printing material being discharged. In this case, the discharged shape of the printing material and bonding between layers of linear printed objects may be adversely affected.

However, unlike the main shaft 30-embedded embodiment described above, a rotatable pipe 60-applied embodiment has the rotatable pipe 60 installed at a distal end of a nozzle 10, and thus may have a disadvantage in that a stationary pipe body or fixed blades 47 cannot be configured at a distal end of the nozzle 10.

Figure 16:
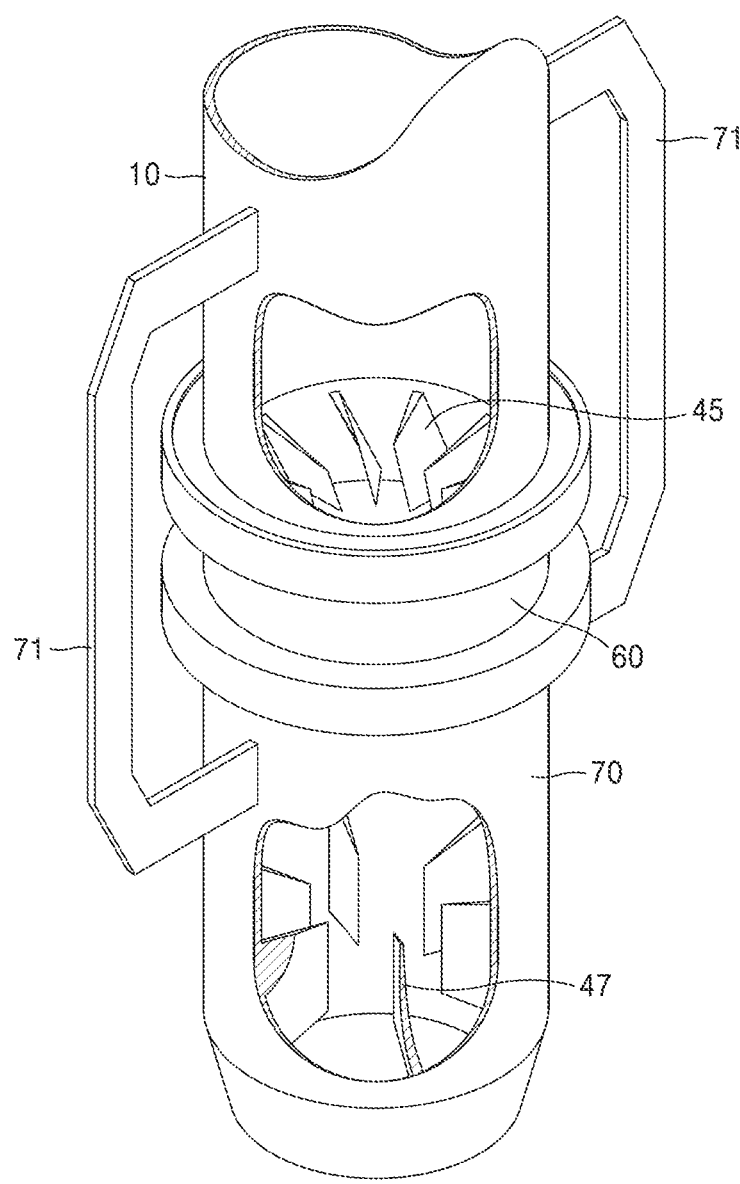
FIG. 16 is a partial cross-sectional perspective view of a main part of an embodiment of the present disclosure to which a rotatable pipe and a fixed pipe are applied.
Figure 17:
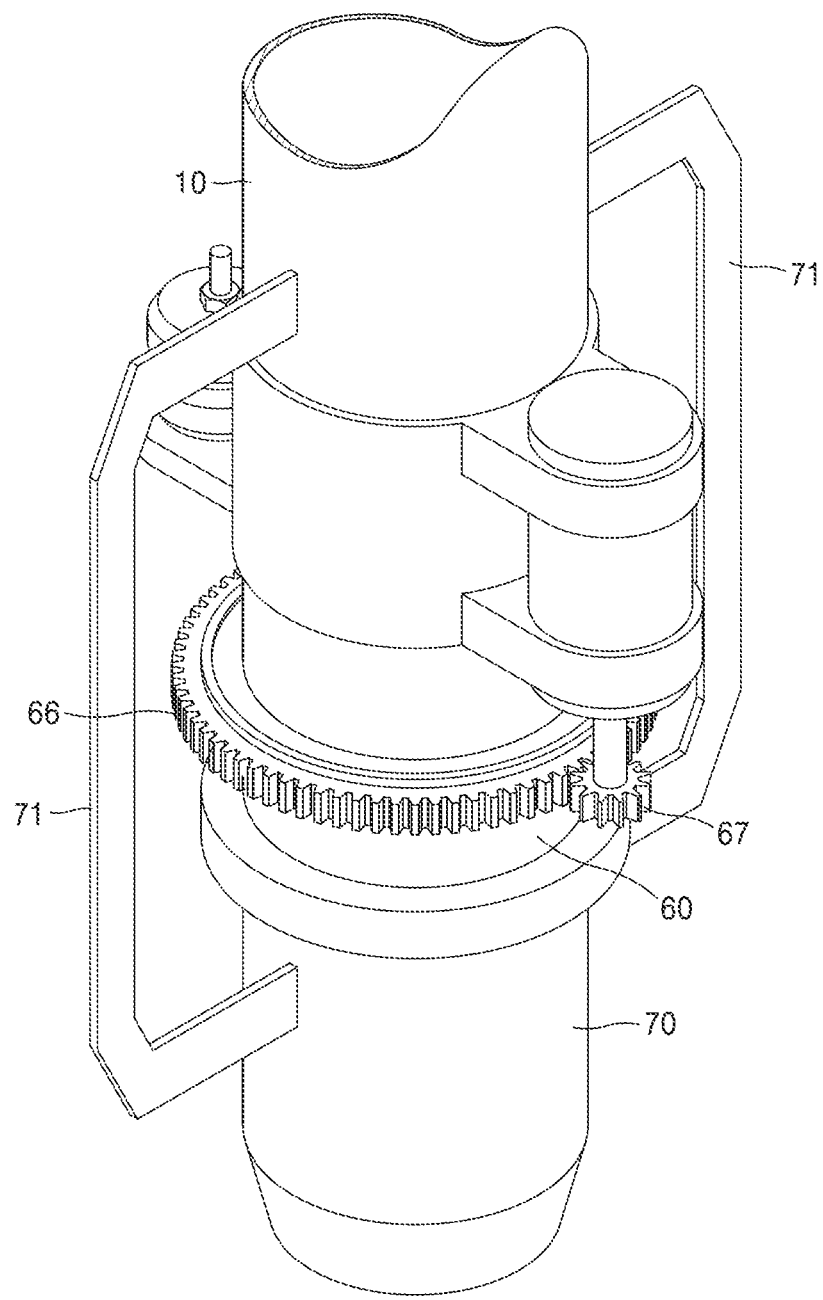
FIG. 17 is a perspective view of a main part of an embodiment of the present disclosure to which a motorized type rotatable pipe and a fixed pipe are applied.

In this regard, in the present disclosure as shown in FIGS. 16 and 17, a fixed pipe 70 which is a pipe body co-axial with the rotatable pipe 60 may be further installed at a distal end of the rotatable pipe 60, a plurality of fixed blades 47 parallel to a central axis of the nozzle 10 are installed radially around the central axis of the nozzle 10 on the inner circumferential surface of the fixed pipe 70, and the fixed pipe 70 and the nozzle 10 are connected by a restricting member 71 to thereby allow a fluid printing material passed through the rotatable pipe 60 to be aligned by the fixed blades 47-embedded fixed pipe 70 before being discharged.

Here, the restricting member 71 may be a plate body that connects and thereby fixes the nozzle 10 to the fixed pipe 70 connected in a freely rotatable manner to a distal end of the rotatable pipe 60 and the nozzle 10 so as to allow the rotatable pipe 60 to rotate between the nozzle 10 and the stationary fixed pipe 70.

Such a fixed pipe 70-applied embodiment is a configuration that can be applied to a motorized type rotatable pipe 60 as shown in FIG. 17, and as a printing material agitated by the rotatable pipe 60 with the agitating blades 45 embedded therein may be aligned while being discharged through the fixed pipe 70 with the fixed blades 47 embedded therein, unnecessary excessive rotation of the printing material being discharged may be inhibited, and stable printing may be enabled.

INDUSTRIAL APPLICABILITY

The present disclosure relates to a 3D printer for construction that prints and forms various structures, and can be used to complete a structure having a desired shape by linearly extruding and stacking a fluidized material to which concrete or mortar is applied.

The invention claimed is:

1. A nozzle of an auto-agitating 3D printer for construction,
   wherein in the nozzle (10) of an auto-agitating 3D printer for construction, a main shaft (30) parallel to the nozzle (10) is embedded in the nozzle (10), a rotatable body (40) configured to freely rotate around the main shaft (30) as an axis is installed, and a part of the main shaft (30) is fixed to an inner circumferential surface of the nozzle (10); and wherein on an outer circumferential surface of the rotatable body (40), a plurality of agitating blades (45) inclined relative to the main shaft (30) are radially formed around the main shaft (30), such that as a fluid printing material is discharged via the nozzle (10), the agitating blades (45) and the rotatable body (40) rotate around the main shaft (30) by their own power without an additional power.

2. The nozzle of the auto-agitating 3D printer for construction of claim 1, wherein a plurality of fixed blades (47) parallel to a central axis of the nozzle (10) are radially formed around the central axis of the nozzle (10) on the inner circumferential surface of the nozzle (10) between the agitating blades (45) and a distal end of the nozzle (10).

3. The nozzle of the auto-agitating 3D printer for construction of claim 1, wherein the main shaft (30) is a hollow pipe body having a transfer hole (33) formed in an axial direction therein;

an exposed pipe (36) as a pipe body having the transfer hole (33) formed in an axial direction therein and exposed outside the nozzle (10) is formed; and a first end of the main shaft (30) is connected to the exposed pipe (36), such that as a filament material (31) introduced into the transfer hole (33) of the exposed pipe (36) is discharged from a second end of the main shaft (30) via the main shaft (30), the filament material (31) may be co-printed with a printing material while embedded therein.

\* \* \* \* \*